US009678852B2

(12) United States Patent
Horley

(10) Patent No.: US 9,678,852 B2
(45) Date of Patent: Jun. 13, 2017

(54) TRACING THE OPERATIONS OF A DATA PROCESSING APPARATUS USING TRACE DATA SOURCE IDENTIFIERS TO RESPOND TO FLUSH REQUESTS

(71) Applicant: ARM Limited, Cambridge (GB)

(72) Inventor: John Michael Horley, Cambridge (GB)

(73) Assignee: ARM Limited, Cambridge (GB)

( * ) Notice: Subject to any disclaimer, the term of this patent is extended or adjusted under 35 U.S.C. 154(b) by 93 days.

(21) Appl. No.: 14/633,630

(22) Filed: Feb. 27, 2015

(65) Prior Publication Data
US 2015/0254160 A1    Sep. 10, 2015

(30) Foreign Application Priority Data
Mar. 7, 2014   (GB) .................................. 1404070.3

(51) Int. Cl.
G06F 11/34    (2006.01)
G06F 11/30    (2006.01)

(52) U.S. Cl.
CPC ...... *G06F 11/3476* (2013.01); *G06F 11/3065* (2013.01); *G06F 11/348* (2013.01); *G06F 11/3466* (2013.01); *G06F 2201/88* (2013.01)

(58) Field of Classification Search
CPC ............. G06F 11/3466; G06F 11/3471; G06F 11/3476; G06F 11/348; G06F 11/349; G06F 11/3495; G06F 2201/86; G06F 2201/865; G06F 2201/87; G06F 2201/885
See application file for complete search history.

(56) References Cited

U.S. PATENT DOCUMENTS

| 2004/0153813 | A1* | 8/2004 | Swoboda | G06F 11/261 714/36 |
| 2005/0210447 | A1* | 9/2005 | Bradley | G06F 11/3476 717/120 |
| 2009/0132863 | A1* | 5/2009 | Ashfield | G06F 11/3466 714/45 |
| 2010/0332909 | A1* | 12/2010 | Larson | G06F 11/3476 714/40 |
| 2013/0238946 | A1* | 9/2013 | Swoboda | H04L 43/10 714/715 |
| 2015/0220439 | A1* | 8/2015 | Mickens | G06F 3/061 711/135 |

FOREIGN PATENT DOCUMENTS

| GB | 2 404 753 | 2/2005 |
| GB | 2 404 754 | 2/2005 |

OTHER PUBLICATIONS

UK Search Report for GB1404070.3, mailed Aug. 22, 2014, 4 pages.

* cited by examiner

*Primary Examiner* — Joseph Schell
(74) *Attorney, Agent, or Firm* — Nixon & Vanderhye P.C.

(57) ABSTRACT

An apparatus for processing data is disclosed in which the operations of data processing circuitry are monitored by one or more trace data sources which generate items of trace data indicative of the data processing operations performed by the data processing circuitry. Trace data source identifiers in a resulting trace stream indicate the source of items of trace data and a selected trace data source identifier is included in the trace stream in response to a received flush request signal. All items of trace data generated before the apparatus received the flush request signal are included in the trace stream before the selected trace data source identifier, such that the conclusion of the response of the apparatus to the flush request signal can be identified.

21 Claims, 11 Drawing Sheets

| | 31 30 29 28 27 26 25 24 | 23 22 21 20 19 18 17 16 | 15 14 13 12 11 10 9 8 | 7 6 5 4 3 2 1 0 |
|---|---|---|---|---|
| | Data | ID or Data (B) | Data | ID or Data (A) F |
| | Data | ID or Data (D) | Data | ID or Data (C) F |
| | Data | ID or Data (G) | Data | ID or Data (E) F |
| | J H G E D C B A | ID or Data (J) | Data | ID or Data (H) F |

ID 0x7B = "FLUSH COMPLETE"

FIG. 4

TRACING THE OPERATIONS OF A DATA PROCESSING APPARATUS USING TRACE DATA SOURCE IDENTIFIERS TO RESPOND TO FLUSH REQUESTS

This application claims priority to GB Application No. 1404070.3, filed on Mar. 7, 2014, the entire content of which is incorporated herein by reference.

BACKGROUND

The present disclosure relates to the field of data processing. More particularly it relates to a data processing apparatus configured to generate a trace stream indicative of its data processing operations.

It is known for a data processing apparatus to be configured to generate a trace stream indicative of its data processing operations. For example, such a configuration may be present in the case of a data processing apparatus embodied as an on-chip device, where the trace stream can allow an external observer seeking to debug the device to monitor its operation and gather information about its performance. The items of trace data which make up the generated trace stream may be temporarily buffered at various points in the data processing apparatus. In this context, it is known for the data processing apparatus to be responsive to a flush request to output any trace data which is currently buffered in the apparatus. A register in the device can be used for the device to indicate when it has acted upon a received flush request, such that the external observer can determine that the flush has been actioned by polling this register.

SUMMARY

Viewed from one aspect an apparatus for processing data is disclosed, the apparatus comprising:
data processing circuitry configured to perform data processing operations;
one or more trace data sources configured to generate items of trace data indicative of the data processing operations performed by the data processing circuitry; and
trace stream generation circuitry configured to generate a trace stream to be output from the apparatus from the items of trace data, wherein the trace stream generation circuitry is configured to include one or more trace data source identifiers in the trace stream,
wherein the apparatus is configured to receive a flush request signal and in response to the flush request signal to include a selected trace data source identifier in the trace stream,
wherein the apparatus is configured to include all items of trace data generated before the apparatus received the flush request signal in the trace stream before the selected trace data source identifier is included in the trace stream.

Viewed from another aspect a method of processing data in a data processing apparatus is disclosed, the method comprising the steps of:
performing data processing operations;
generating in one or more trace data sources items of trace data indicative of the data processing operations performed;
generating a trace stream to be output from the data processing apparatus;
including one or more trace data source identifiers in the trace stream;
receiving a flush request signal;
in response to the flush request signal, including a selected trace data source identifier in the trace stream,
wherein the step of generating the trace stream is configured to include all items of trace data generated before the flush request signal was received in the trace stream before the selected trace data source identifier is included in the trace stream.

Viewed from another aspect an apparatus for processing data is disclosed, the apparatus comprising:
means for performing data processing operations;
means for generating in one or more trace data sources items of trace data indicative of the data processing operations performed;
means for generating a trace stream to be output from the data processing apparatus and for including one or more trace data source identifiers in the trace stream;
means for receiving a flush request signal;
means for, in response to the flush request signal, including a selected trace data source identifier in the trace stream,
wherein the means for generating the trace stream is configured to include all items of trace data generated before the flush request signal was received in the trace stream before the selected trace data source identifier is included in the trace stream.

Viewed from another aspect an apparatus for processing data is disclosed, the apparatus comprising:
one or more trace data sources configured to generate items of trace data indicative of the data processing operations performed by associated data processing circuitry; and
trace stream generation circuitry configured to generate a trace stream to be output from the apparatus from the items of trace data, wherein the trace stream generation circuitry is configured to include one or more trace data source identifiers in the trace stream,
wherein the apparatus is configured to receive a flush request signal and in response to the flush request signal to include a selected trace data source identifier in the trace stream,
wherein the apparatus is configured to include all items of trace data generated before the apparatus received the flush request signal in the trace stream before the selected trace data source identifier is included in the trace stream.

Viewed from another aspect a method of processing data in a data processing apparatus is disclosed, the method comprising the steps of:
generating in one or more trace data sources items of trace data indicative of the data processing operations performed by associated data processing circuitry;
generating a trace stream to be output from the data processing apparatus;
including one or more trace data source identifiers in the trace stream;
receiving a flush request signal;
in response to the flush request signal, including a selected trace data source identifier in the trace stream,
wherein the step of generating the trace stream is configured to include all items of trace data generated before the flush request signal was received in the trace stream before the selected trace data source identifier is included in the trace stream.

Viewed from another aspect an apparatus for processing data is disclosed, the apparatus comprising:
means for generating in one or more trace data sources items of trace data indicative of data processing operations performed by associated data processing circuitry;
means for generating a trace stream to be output from the data processing apparatus and for including one or more trace data source identifiers in the trace stream;
means for receiving a flush request signal;

means for, in response to the flush request signal, including a selected trace data source identifier in the trace stream, wherein the means for generating the trace stream is configured to include all items of trace data generated before the flush request signal was received in the trace stream before the selected trace data source identifier is included in the trace stream.

Viewed from another aspect an apparatus for processing data is disclosed, the apparatus comprising:

trace stream reception circuitry configured to receive a trace stream, wherein the trace stream is indicative of the data processing operations performed by data processing circuitry in a further data processing apparatus, wherein the trace stream includes one or more trace data source identifiers indicative of one or more trace data sources in the further data processing apparatus;

trace analysis circuitry configured to identify a selected trace data source identifier in the trace stream as a conclusion of a response to a flush request signal received by the further data processing apparatus.

Viewed from another aspect a method of processing data is disclosed, the method comprising the steps of:

receiving a trace stream, the trace stream indicative of data processing operations performed by data processing circuitry in a data processing apparatus, wherein the trace stream includes one or more trace data source identifiers indicative of one or more trace data sources in the data processing apparatus;

identifying a selected trace data source identifier of the trace data source identifiers included in the trace stream; and delimiting the selected trace data source identifier in the trace stream as a conclusion of a response to a flush request signal received by the data processing apparatus.

Viewed from another aspect a computer readable storage medium is disclosed having stored thereon in a non-transient fashion a computer program configured, when executed on a computer, to cause the computer to carry out the method of the previous aspect.

Viewed from another aspect an apparatus for processing data is disclosed, the apparatus comprising:

means for receiving a trace stream, the trace stream indicative of data processing operations performed by data processing circuitry in a data processing apparatus, wherein the trace stream includes one or more trace data source identifiers indicative of one or more trace data sources in the data processing apparatus;

means for identifying a selected trace data source identifier of the trace data source identifiers included in the trace stream; and means for delimiting the selected trace data source identifier in the trace stream as a conclusion of a response to a flush request signal received by the data processing apparatus.

BRIEF DESCRIPTION OF THE DRAWINGS

The present techniques will be described further, by way of example only, with reference to embodiments thereof as illustrated in the accompanying drawings, in which:

FIG. 4 shows the formatting protocol for trace data in one embodiment;

DESCRIPTION OF EXAMPLE EMBODIMENTS

Figure 1:
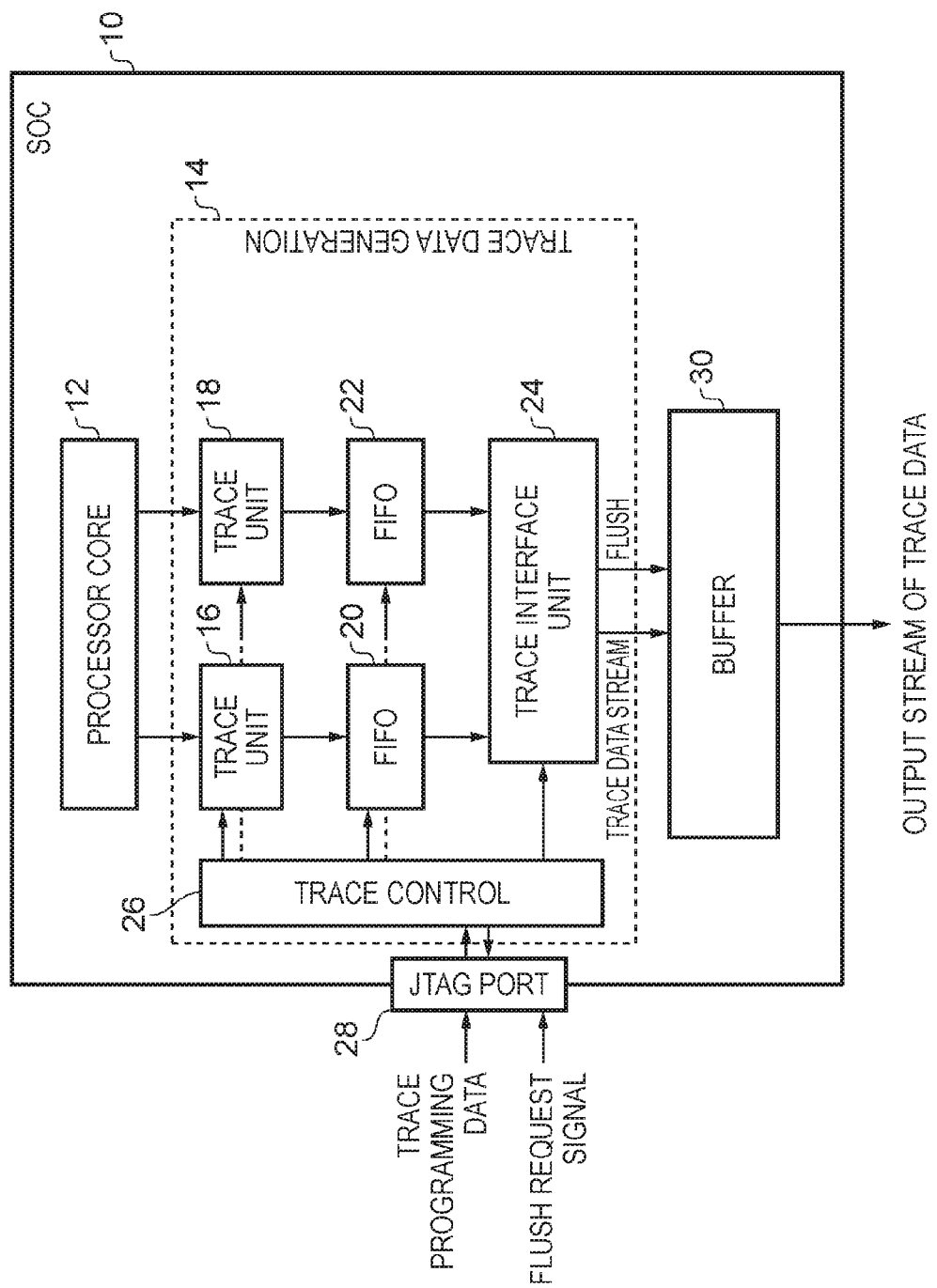
FIG. 1 schematically illustrates a data processing apparatus configured as a system-on-chip in one embodiment.

At least some embodiments comprise an apparatus for processing data, the apparatus comprising:

data processing circuitry configured to perform data processing operations;

one or more trace data sources configured to generate items of trace data indicative of the data processing operations performed by the data processing circuitry; and trace stream generation circuitry configured to generate a trace stream to be output from the apparatus from the items of trace data, wherein the trace stream generation circuitry is configured to include one or more trace data source identifiers in the trace stream, wherein the apparatus is configured to receive a flush request signal and in response to the flush request signal to include a selected trace data source identifier in the trace stream, wherein the apparatus is configured to include all items of trace data generated before the apparatus received the flush request signal in the trace stream before the selected trace data source identifier is included in the trace stream.

The present techniques recognise that the prior art technique of using a register in the device to indicate when the device has acted upon a received flush request can become unreliable in the context of contemporary data processing apparatuses in which the output path via which the trace stream is output is becoming longer and more complex. For example, it is recognised that one or more buffers placed on the trace output path can mean that the known technique of polling a register on the data processing apparatus to determine when the flush request has been responded to can fail because some trace data may still be stored in intervening buffers even when this register has been set to indicate a completed flush response. Effectively, a race condition exists between the polling mechanism and the trace data output path.

In this context, the present techniques recognise the need for a different approach to indicating that the requested trace flush has completed. However, in the context of trace stream generation from a data processing apparatus, the present techniques also recognise the disadvantage generally associated with introducing additional bespoke signals in the trace stream, since the bandwidth over which the trace stream is output is generally at a premium. The inventor of the present techniques has advantageously realised that in a trace stream generation configuration which uses one or more trace data source identifiers to indicate the source of items of trace data, a selected trace data source identifier can be used to indicate the response to the received flush request signal. Given that the trace stream is already configured to allow trace data source identifiers to be represented, the use of a trace data source identifier does not disrupt the formatting and structure of the trace stream. Moreover, the above-mentioned race condition can also be avoided, given that the selected trace data source identifier forms part of the trace stream and can therefore be arranged with respect to the other items of trace data such that all items of trace data which were generated before the apparatus received the flush request signal are added to the trace stream before the selected trace data source identifier is itself is included in the trace stream. reception of the selected trace data source identifier can thus safely be interpreted as the conclusion of the response to the flush request signal. In other words it will be appreciated that the apparatus is configured to receive a flush request signal and is configured in response to the flush request signal to include the selected trace data source identifier in the trace stream indicative of completion of a flush request.

In some embodiments the trace stream generation circuitry is configured to include a respective trace data source identifier in the trace stream which indicates a respective trace data source of the one or more trace data sources which generated a respective portion of the trace stream. Accordingly, the trace data source identifiers can be used to label portions of the trace stream, and in particular the items of trace data in those portions. For example, it can be interpreted that all items of trace data which follow a trace data source identifier in the trace stream (i.e. before another trace data source identifier is found) have come from a trace data source labelled by that trace data source identifier.

In some embodiments the apparatus comprises more than one trace data source and wherein the trace stream generation circuitry is configured to include in the trace stream a corresponding trace data source identifier after all items of trace data generated by a corresponding trace data source before the apparatus received the flush request signal. Accordingly, where more than one trace data source is generating items of trace data which go into the trace stream, the trace data source identifiers can be used to indicate the point at which the flush request signal was received with respect to each trace data source, by introducing a corresponding trace data source identifier after all items of trace data generated by a corresponding trace data source that had already been generated by that corresponding trace data source before the apparatus received the flush request signal. Effectively, an individual flush response with respect to each trace data source can therefore be identified in the trace stream.

In some embodiments the apparatus further comprises at least one trace buffer downstream of the trace stream generation circuitry and configured to buffer the trace stream before it is output from the apparatus. The present techniques are of particular benefit when at least one such trace buffer is present, due to the greater range in size of trace data which may then be output in response to a flush request signal, potentially leading (in the absence of the present techniques) to a greater range of uncertainty for the recipient of the trace stream about what should be interpreted as part of the response to the flush request signal.

In some embodiments the trace stream generation circuitry is configured to generate a flush propagation signal in response to the flush request signal, the flush propagation signal configured to cause any trace data buffered in the at least one trace buffer to be output from the apparatus. Depending on the existing configuration and requirements it may be considered to be sufficient for the inclusion of the selected trace data source identifier in the trace stream to indicate the response to the flush request signal, however, the flush propagation signal allows a more active response to the flush request signal to be carried out, in particular wherein the content of a trace buffer is caused to be output.

In some embodiments the apparatus is configured to generate payload data to be included in the trace stream associated with the selected trace data source identifier. The trace data source identifiers are generally configured to indicate the source of items of trace data which are included in the trace stream, and mechanisms are therefore generally already provided to associate particular data with particular trace data source identifiers. These mechanisms can be taken advantage of here by associating payload data with the selected trace data source identifier. This payload data can carry a variety of information, allowing an advantageous range of flexibility in the interpretation of the selected trace data source identifier.

In some embodiments the payload data is indicative of a respective flush request signal of multiple flush request signals received by the apparatus. Due to the buffering of the trace stream which can occur, the present techniques recognise that the opportunity arises for more than one flush request signal to be "in-flight" in the system at any given time. In particular, a further flush request signal can be received before the response of the apparatus to an earlier flush request signal (i.e. the inclusion of the selected trace data source identifier in the trace stream) has been received. In this situation, the payload data can be used to identify a particular flush request signal.

The payload data could identify each flush request signal in a variety of ways, but in some embodiments the apparatus comprises a counter unit configured to increment a counter value for each flush request signal received, and wherein the apparatus is configured to include the counter value in the payload data. The counter value thus provides a unique reference by which each flush request signal can be labelled.

In some embodiments the apparatus comprises flush response identifier value storage configured to store a flush response identifier value and to include the flush response identifier value in the payload data. Accordingly a particular value can be stored in dedicated storage and used as (at least part of) the payload data. This value thus also provides a unique reference by which each flush request signal can be labelled.

The flush response identifier value may be configured in a variety of ways, but in some embodiments the flush response identifier value storage is configured to be programmed by an external interface to the apparatus. For example in the context of a system-on-chip apparatus, this external interface may for example be a JTAG interface on the periphery of the chip.

In some embodiments the apparatus is configured to receive the flush request signal via the external interface and to receive the flush response identifier value in association with the flush request signal. In other words, the flush response identifier value (to be included in the payload data) may be provided by the same source that provided the flush request signal. For example it may therefore be an external debugger which sends the flush request signal and provides the flush response identifier value in association therewith.

In some embodiments the flush response identifier value storage is configured to be programmed by control circuitry in the apparatus. In other words control over the flush response identifier value which is included in the payload data may be provided within the apparatus itself.

The payload data may be of particular use in indicating additional information with respect to the one or more trace data sources when the apparatus responds to a flush request signal. For example, in some embodiments, the apparatus is configured to include in the payload data an indication of one or more trace data sources for which all respective items of trace data generated before the apparatus received the flush request signal have been included in the trace stream. In other words, the payload data can thus be used to indicate one or more trace data sources which have now "flushed" in response to the flush request signal. There may be further trace data sources which have not yet "flushed" and a later selected trace data source identifier (potentially with further payload data) may be used to indicate when those further trace data sources have also flushed.

In some embodiments the apparatus is further configured to cease generation of the trace stream in response to the flush request signal until a trace restart signal is received.

Whilst the selected trace data source identifier may be predetermined for the apparatus, in some embodiments the apparatus is configured such that the selected trace data source identifier which is included in the stream of trace data is programmable. This programming may be by an agent external to the apparatus or may be by control circuitry within the apparatus.

The apparatus may output the trace stream for analysis by an agent external to the apparatus, as in the example of a system-on-chip configuration where the trace stream is accumulated in an external buffer (such as a "capture box") to then be analysed either by analysis capability provided in association with that external buffer (e.g. as part of the capture box) or for example to be analysed by a separate analysis device such as a computer. However the analysis may also take place internal to the apparatus and in some embodiments the apparatus further comprises trace analysis circuitry configured to receive the trace stream and to identify the selected trace data source identifier in the trace stream of trace data as a conclusion of a response to a flush request signal received by the further data processing apparatus.

At least some embodiments comprise a method of processing data in a data processing apparatus, the method comprising the steps of:

performing data processing operations;

generating in one or more trace data sources items of trace data indicative of the data processing operations performed;

generating a trace stream to be output from the data processing apparatus;

including one or more trace data source identifiers in the trace stream;

receiving a flush request signal;

in response to the flush request signal, including a selected trace data source identifier in the trace stream, wherein the step of generating the trace stream is configured to include all items of trace data generated before the flush request signal was received in the trace stream before the selected trace data source identifier is included in the trace stream.

At least some embodiments comprise an apparatus for processing data, the apparatus comprising:

means for performing data processing operations;

means for generating in one or more trace data sources items of trace data indicative of the data processing operations performed;

means for generating a trace stream to be output from the data processing apparatus and for including one or more trace data source identifiers in the trace stream;

means for receiving a flush request signal;

means for, in response to the flush request signal, including a selected trace data source identifier in the trace stream, wherein the means for generating the trace stream is configured to include all items of trace data generated before the flush request signal was received in the trace stream before the selected trace data source identifier is included in the trace stream.

At least some embodiments comprise an apparatus for processing data, the apparatus comprising:

one or more trace data sources configured to generate items of trace data indicative of the data processing operations performed by associated data processing circuitry; and trace stream generation circuitry configured to generate a trace stream to be output from the apparatus from the items of trace data, wherein the trace stream generation circuitry is configured to include one or more trace data source identifiers in the trace stream, wherein the apparatus is configured to receive a flush request signal and in response to the flush request signal to include a selected trace data source identifier in the trace stream, wherein the apparatus is configured to include all items of trace data generated before the apparatus received the flush request signal in the trace stream before the selected trace data source identifier is included in the trace stream.

Accordingly the present techniques also comprise the above described techniques applied in the context of tracing the data processing operations of data processing circuitry which does not form part of the apparatus itself. As such the apparatus in such embodiments may thus be considered to form a set of monitoring circuitry which is provided in association with separate data processing circuitry. For example this is the case where the apparatus does not comprise a processor core, but is connected to such a processor core to monitor its operations.

At least some embodiments comprise a method of processing data in a data processing apparatus, the method comprising the steps of:

generating in one or more trace data sources items of trace data indicative of the data processing operations performed by associated data processing circuitry;

generating a trace stream to be output from the data processing apparatus;

including one or more trace data source identifiers in the trace stream;

receiving a flush request signal;

in response to the flush request signal, including a selected trace data source identifier in the trace stream, wherein the step of generating the trace stream is configured to include all items of trace data generated before the flush request signal was received in the trace stream before the selected trace data source identifier is included in the trace stream.

At least some embodiments comprise an apparatus for processing data, the apparatus comprising:

means for generating in one or more trace data sources items of trace data indicative of data processing operations performed by associated data processing circuitry;

means for generating a trace stream to be output from the data processing apparatus and for including one or more trace data source identifiers in the trace stream;

means for receiving a flush request signal;

means for, in response to the flush request signal, including a selected trace data source identifier in the trace stream, wherein the means for generating the trace stream is configured to include all items of trace data generated before the flush request signal was received in the trace stream before the selected trace data source identifier is included in the trace stream.

At least some embodiments comprise an apparatus for processing data, the apparatus comprising:

trace stream reception circuitry configured to receive a trace stream, wherein the trace stream is indicative of the data processing operations performed by data processing circuitry in a further data processing apparatus, wherein the trace stream includes one or more trace data source identifiers indicative of one or more trace data sources in the further data processing apparatus;

trace analysis circuitry configured to identify a selected trace data source identifier in the trace stream as a conclusion of a response to a flush request signal received by the further data processing apparatus.

In such embodiments apparatus is therefore provided which allows the corresponding analysis of the trace stream generated according to the above described techniques to be performed. In particular, where one or more trace data source identifiers are used in the trace stream to indicate one or more trace data sources from which the items of trace data in the trace stream have originated, trace analysis circuitry in the apparatus is configured to interpret those trace data source identifiers as indicative of the respective trace data sources, but further to identify a selected trace source identifier as a conclusion of the response to a flush request signal. This thus enables the apparatus to know when the flush response performed by the further processing apparatus in response to the flush request signal has completed. For example where all items of trace data which were generated before the flush request signal was received are to be the subject of a particular analysis procedure, the apparatus which receives the trace stream can then separate these items off for that analysis.

In some embodiments the apparatus further comprises flush request circuitry configured to generate the flush request signal for transmission to the further data processing apparatus. Hence, the apparatus is then able to coordinate its own analysis procedure by passing a flush request signal to the further data processing apparatus and by being able to identify the conclusion of the response of the further data processing apparatus to the flush request signal by the identification of the selected trace data source identifier in the trace stream.

In some embodiments the apparatus is configured to pass the trace stream on to an analysis apparatus and is configured to signal identification of the selected trace source identifier to the analysis apparatus. Accordingly the apparatus may itself be an intermediate device, such as in the example of a capture box interposed between the data processing apparatus being analysed and an analysis device such as a computer. Signalling the identification of the selected trace source identifier enables action to be taken by the analysis apparatus (e.g. refreshing a display) coordinated with the flush response.

In some embodiments the apparatus comprises a counter unit configured to increment a counter value for each flush request signal transmitted to the further data processing apparatus, and wherein the trace analysis circuitry is configured to identify the counter value in payload data in the trace stream associated with the selected trace data source identifier. The apparatus can therefore issue multiple flush request signals to the further data processing apparatus and distinguish between the respective responses to those multiple flush request signals with reference to the matching counter values which are then identified in the payload data in the trace stream.

In some embodiments the apparatus is configured to cause a flush response identifier value to be stored in flush response identifier value storage in the further data processing apparatus, wherein the flush response identifier value is indicative of a selected flush request signal which is transmitted to the further data processing apparatus. This provides another mechanism for the apparatus to be able to issue multiple flush request signals to the further data processing apparatus and distinguish between the respective responses to those multiple flush request signals with reference to the flush response identifier value associated with each response.

At least some embodiments comprise a method of processing data, the method comprising the steps of:

receiving a trace stream, the trace stream indicative of data processing operations performed by data processing circuitry in a data processing apparatus, wherein the trace stream includes one or more trace data source identifiers indicative of one or more trace data sources in the data processing apparatus;

identifying a selected trace data source identifier of the trace data source identifiers included in the trace stream; and delimiting the selected trace data source identifier in the trace stream as a conclusion of a response to a flush request signal received by the data processing apparatus.

At least some embodiments comprise a computer readable storage medium having stored thereon in a non-transient fashion a computer program configured, when executed on a computer, to cause the computer to carry out the method of the above mentioned embodiments.

At least some embodiments comprise an apparatus for processing data, the apparatus comprising:

means for receiving a trace stream, the trace stream indicative of data processing operations performed by data processing circuitry in a data processing apparatus, wherein the trace stream includes one or more trace data source identifiers indicative of one or more trace data sources in the data processing apparatus;

means for identifying a selected trace data source identifier of the trace data source identifiers included in the trace stream; and means for delimiting the selected trace data source identifier in the trace stream as a conclusion of a response to a flush request signal received by the data processing apparatus.

FIG. 1 schematically illustrates a data processing apparatus 10 which is configured as a system-on-chip (SoC) device 10. The data processing operations of the device 10 are carried out by the processor core 12 by the execution of program instructions and the retrieval of data values from and storage of processed data values to an associated memory (not illustrated). The data processing apparatus 10 is configured to allow the data processing operations of its processor core 12 to be monitored, in particular by the provision of trace generation circuitry 14 which enables a trace data stream to be generated comprising items of trace data which are indicative of the data processing operations which the processor core 12 carries out. The stream of trace data is ultimately output from the SoC 10, such that an external observer can monitor the data processing operations which the processor core 12 is carrying out.

In order to monitor the data processing operations carried out by the processor core 12, the trace generation circuitry 14 comprises two trace units 16 and 18 which are coupled to the processor core 12 and are configured to generate items of trace data which are indicative of particular data processing operations which the processor core 12 carries out. Each trace unit may for example be configured to monitor a different aspect of the data processing operations. The items of trace data generated by the respective trace units 16 and 18 are passed via the respective FIFOs 20 and 22 to the trace interface unit 24, which combines these into the single trace data stream which it generates. The trace units 16, 18, the FIFOs 20, 22 and the trace interface unit 24 are configured in their operations by the trace control unit 26. The trace control unit 26 is accessible via an external interface to the SoC 10, in the illustrated embodiment this external interface being a JTAG port 28 which allows an external agent to program the trace control unit 26 and hence the operation of the components of the trace data generation circuitry 14.

The JTAG port 28 also provides the interface via which the data processing apparatus 10 is configured to receive a flush request signal, in response to which the components of the trace data generation circuitry 14 are configured to output any trace data which is currently buffered within them. More detail of this response to a received flush request signal will be described below. Finally, the SoC 10 also comprises a buffer 30 which lies on the output path of the trace data stream from the trace interface unit 24. In addition to the response of the trace data generation circuitry 14 to the flush request signal, the trace interface unit 24 is configured to "propagate" the flush request signal received onwards to the buffer 30, the reception of this propagated flush signal by the buffer 30 also causing any trace data buffered in the buffer 30 to be output from the SoC 10.

Figure 2:
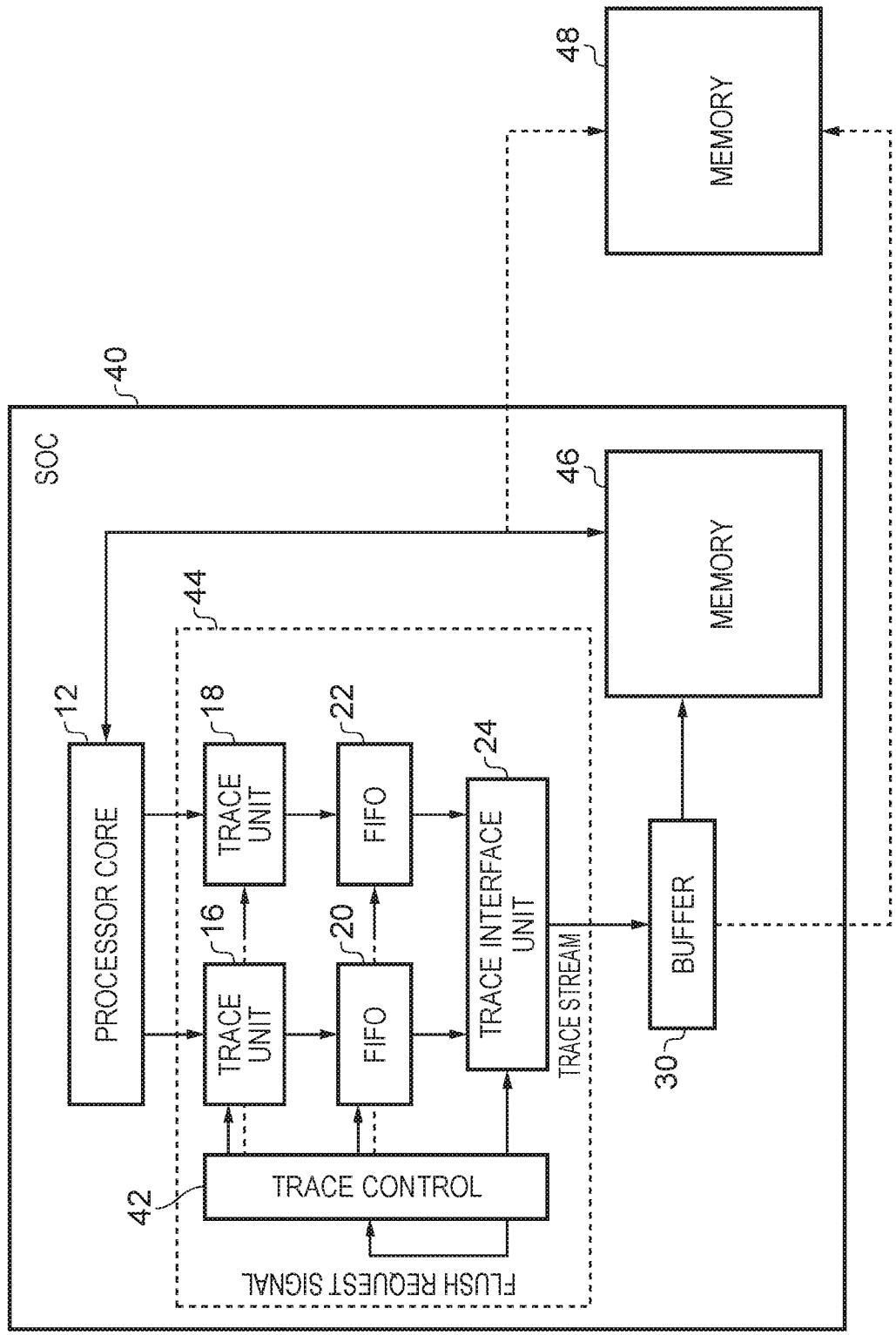
FIG. 2 schematically illustrates a data processing apparatus configured as a system-on-chip in one embodiment.

FIG. 2 schematically illustrates a SoC device 40 which in general is very similarly configured to the SoC device 10 schematically illustrated in FIG. 1. Indeed, the processor core 12, and most sub-components of the trace data generation circuitry 44 (equivalent to trace data generation circuitry 14 in FIG. 1) are given the same reference numerals in FIG. 2 and are mostly not described again here. A notable difference however between the configuration of the SoC 40 in FIG. 2 and the SoC 10 in FIG. 1 is that the trace control unit 42 is configured to initiate the flush request signal. As shown in FIG. 2, the flush request signal is both generated by and received by the trace control unit 42. It should be appreciated that the represented path of the flush request signal is schematic only and there is no technical need for the flush request signal to leave/return to the trace control unit 42. Indeed in many embodiments the flush control signal will simply be triggered internally to the trace control unit 42. This triggering may for example be in response to a predetermined event, be periodic or can be freely configured in any other way.

The trace control unit 42 (and hence more generally the trace generation circuitry 44) is programmed by software in the embodiment shown in FIG. 2, this being represented in FIG. 2 by the path from processor core 12 to trace control unit 42. This software control can control all aspects of the operation of trace control unit 42 and can therefore provide all control parameters and values which might otherwise be provided by an external agent (such as a debugger), for example via an interface such as the JTAG port 28 in the embodiment of FIG. 1. As such it should be appreciated that in the examples which follow (in particular with respect to FIGS. 6A and 6B), where control parameters or values are described as being received from an external source, these may alternatively (in an embodiment such as that shown in FIG. 2) be received under software control within the SoC.

The trace stream generated by the trace interface unit 24 is buffered by the buffer 30 before being stored in memory 46. Memory 46 is, in the illustrated embodiment, provided as part of the SoC 40, but the dashed path in from buffer 30 in FIG. 2 shows that the trace stream could alternatively (or in addition) be stored in a memory 48 which is external to the SoC 40. The stored trace stream is subsequently analysed by software executing within the SoC 40, and hence in FIG. 2 the processor core 12 is shown with an access path to the memory 46. Where the trace stream has been stored in an external memory 48 the analysis software may instead (as represented by the dashed line extending the processor core access path) access the stored trace stream in the external memory 48.

Figure 3A:
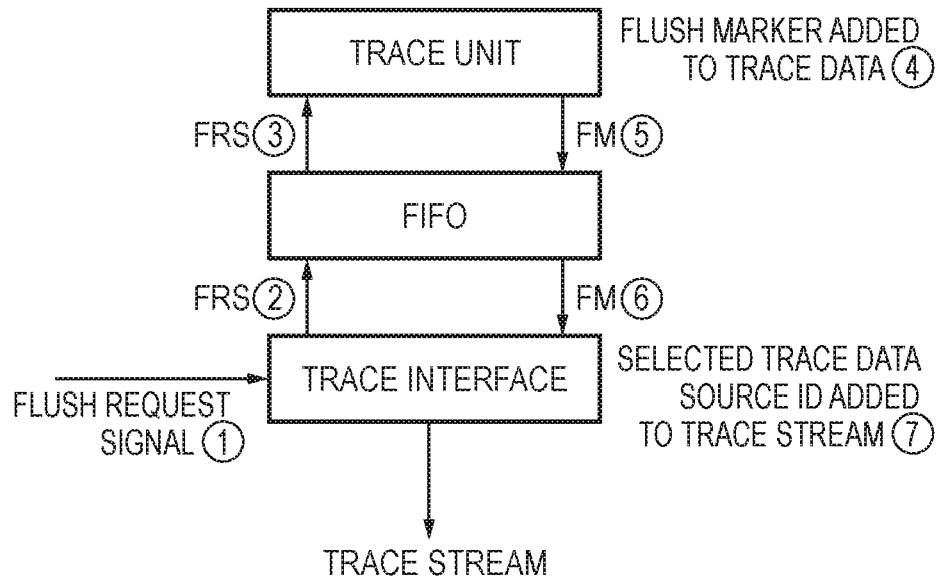
FIGS. 3A and 3B schematically illustrate the reception of a flush request signal and the resulting addition of a trace data source identifier into the trace stream in embodiments.
Figure 3B:
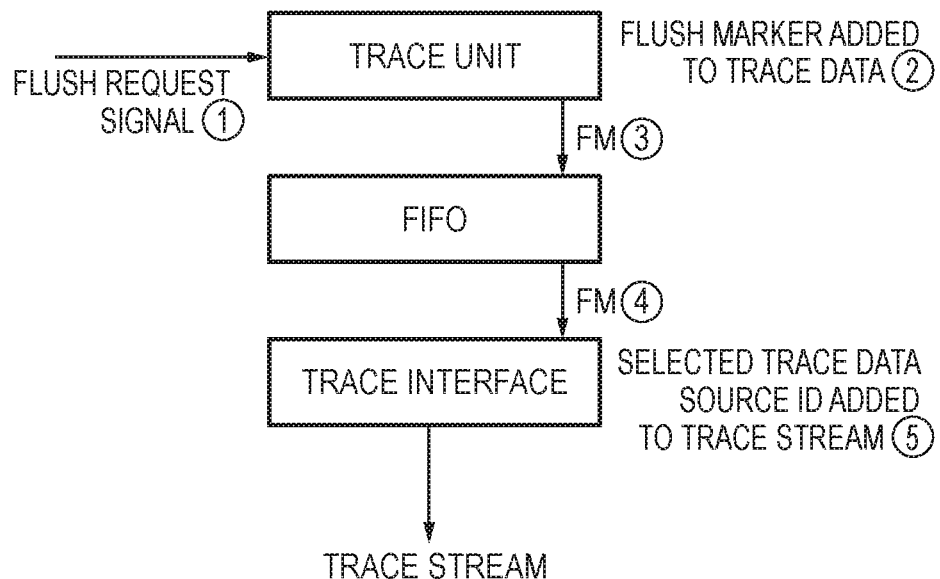

FIGS. 3A and 3B schematically illustrate two ways in which the flush request signal mentioned above may be passed to and propagated through the components of the trace data generation circuitry. In FIG. 3A, the flush request signal is configured to be received by the trace interface unit which then causes this flush request signal (FRS) to be propagated upstream, via the FIFO, to a trace unit. Note that where more than one trace unit is provided—as in the example embodiments shown in FIGS. 1 and 2—the trace interface unit can cause one flush request signal received to be propagated upstream to more than one trace unit. Once the flush request signal is received by a respective trace unit, that trace unit causes a flush marker (FM) to be added to the items of trace data which it is generating and this flush marker then follows the "usual" path of generated items of trace data, namely from the trace unit, through the FIFO, to the trace interface unit. The trace interface unit is configured (as will be described in more detail below with reference to the formatting illustrated in FIG. 4) to "label" the trace stream which it generates to indicate the source of the items of trace data which make up that trace stream. In addition, according to the present techniques, the trace interface unit is configured to make use of a selected (reserved) trace data source identifier, which forms part of the set of possible trace data source identifiers, to indicate the response of the system to the received flush request signal.

FIG. 3B schematically illustrates a configuration in which a trace unit is configured to receive the flush request signal and in response to the reception of this flush request signal, the trace unit adds a flush marker to the items of trace data which it is generating, this flush marker then following the usual trace data item path via the FIFO to the trace interface unit. There, in the same way as described above with reference to FIG. 3A, the trace interface unit is configured to add the selected (reserved) trace data source identifier to the trace stream in order to indicate the response of the system to the reception of the flush request signal.

It should be noted that the propagation of the flush marker from the trace unit through the FIFO to the trace interface unit in either of the configurations shown in FIGS. 3A and 3B ensures that all items of trace data which were generated by the trace unit illustrated before the apparatus received the flush request signal will be added to the generated trace stream before the selected trace data source identifier itself is included in the trace stream. In turn, this ensures that the recipient of the trace stream can reliably identify the selected trace data source identifier as the conclusion of the response of the system to the reception of the flush request signal.

FIG. 4 shows the construction of the data packets formatted by the trace interface unit and output as the trace stream. Four 32-bit words are shown in FIG. 4, wherein the second and fourth byte of each word always contain data, whilst the first and third bytes can either be used for data or to represent a trace data source identifier (ID). The flag bit F is used (1=ID, 0=data) to indicate whether the following byte represents an identifier or data. Where the second and fourth bytes are always data, the corresponding bit at the end of the sequence (bits A-J) indicates if this second/fourth byte corresponds to the new ID (F bit clear) or the previous ID (F bit set). As also shown in FIG. 4, one particular ID value (namely ID=0x7B) is used to indicate the response of the system to the reception of the flush request signal i.e. "flush complete". In other words, the system is configured, in response to the flush request signal, to include the selected trace data source identifier (here ID=0x7B) in the trace stream indicative of completion of the flush request. This advantageously means that the completion of the flush response can be signalled to the recipient of the trace stream without this functionality requiring additional configuration within the formatting shown.

Figure 5:
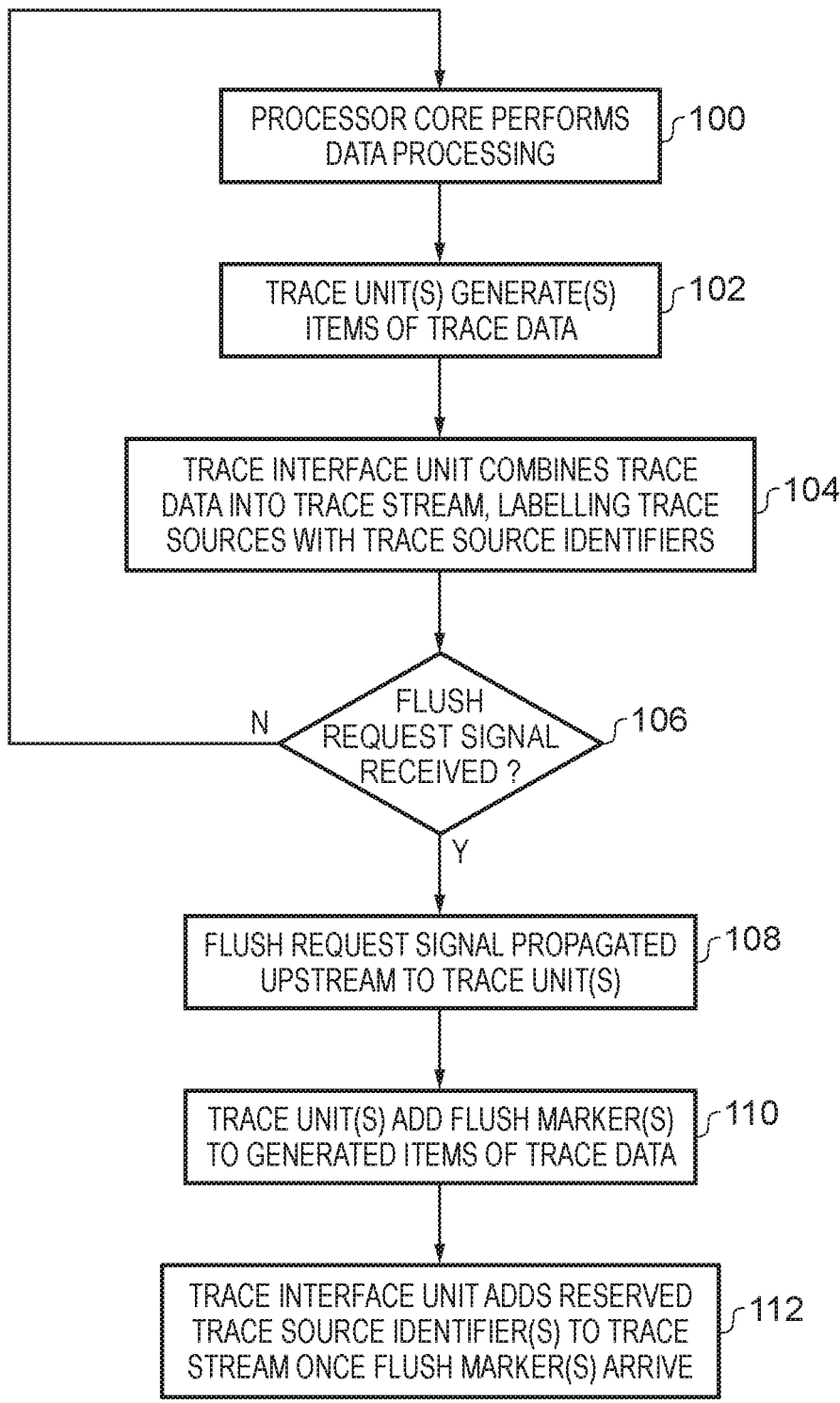
FIG. 5 illustrates a sequence of steps which are taken by the method of one embodiment.

FIG. 5 illustrates a sequence of steps which are taken in the method of one embodiment. At step 100 the processor core is performing its data processing operations and as a result, at step 102, one or more of the trace units associated with the processor core generates corresponding items of trace data indicative of those data processing operations being performed. Then at step 104, the trace interface unit combines the trace data items it receives from the respective trace units into a trace stream, labelling the trace sources of particular portions of the trace data with trace source identifiers (for example according to the formatting shown in FIG. 4). At step 106 it is determined whether a flush request signal has been received, and whilst it has not the flow returns to step 100 and the ongoing process of data processing being carried out by the processor core and traced by the trace units/trace interface unit continues. However, when it is determined that a flush request signal has been received at step 106, then the flow proceeds to step 108, where (in accordance with the embodiment schematically illustrated in FIG. 3A) the flush request signal is propagated upstream from the trace interface unit where it is received by the respective trace units. Once received there (at step 110) the respective trace units add flush markers to the items of trace data which they generate and thus thereafter, at step 112, once the respective flush markers arrive at the trace interface unit it adds corresponding reserved trace source identifiers to the trace stream in order to indicate that the required flush response has been completed.

Figure 6A:
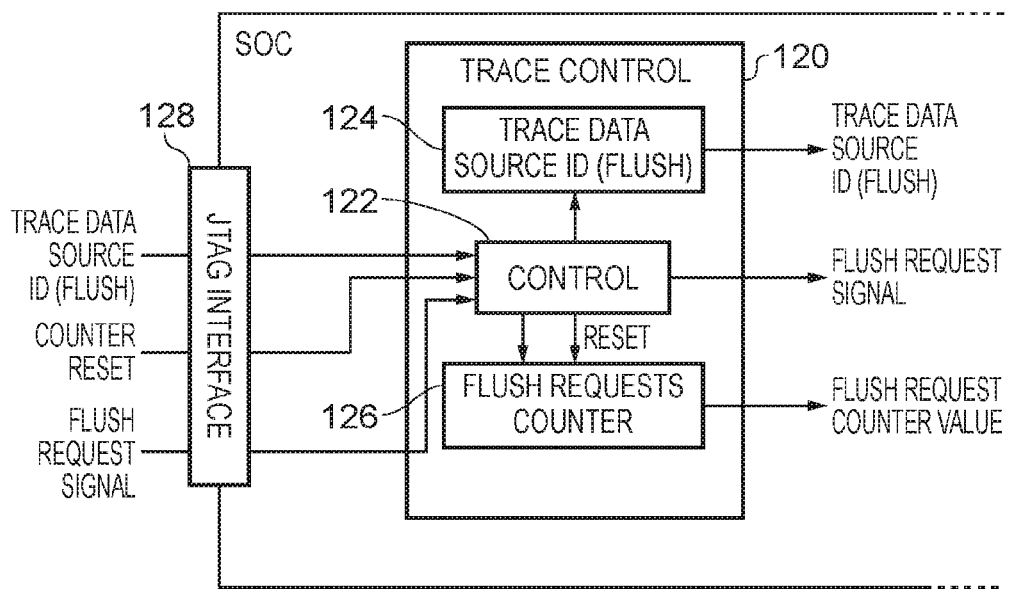
FIGS. 6A and 6B schematically illustrate an external interface and trace control unit in embodiments.
Figure 6B:
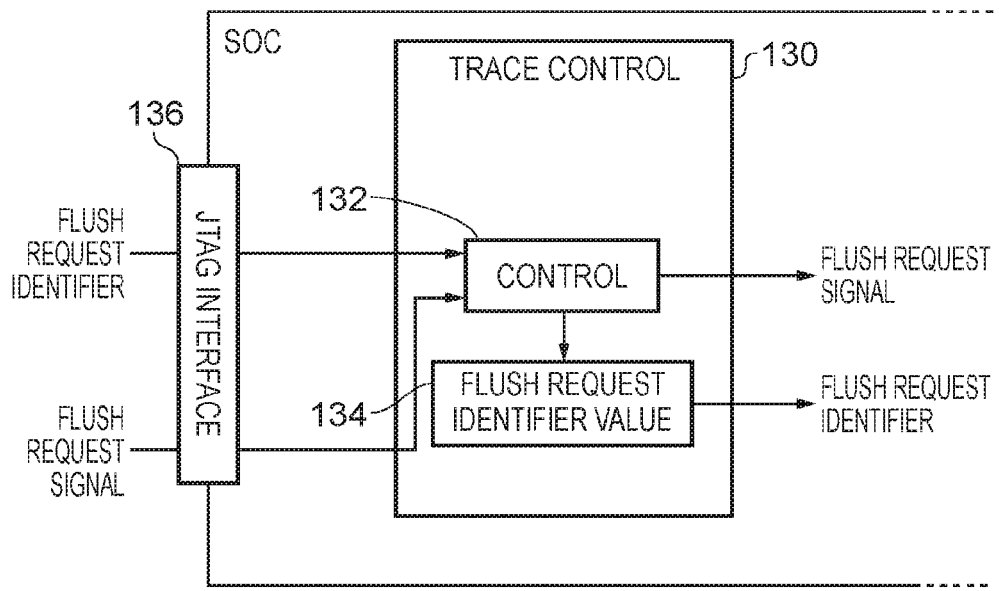

FIGS. 6A and 6B schematically illustrate two configurations of a trace control unit provided as part of trace data generation circuitry in a SoC embodiment. The trace control unit 120 shown in FIG. 6A has a central control unit 122, a trace data source identifier (flush) storage 124 and a flush request counter 126. The content of the trace data source identifier (flush) storage 124 defines the "reserved" identifier which the trace interface unit is configured to use to indicate the flush response, i.e. ID0x7B in the example of FIG. 4. This "reserved" identifier will typically be a fixed, predetermined value which does not change. However, as shown in the embodiment in FIG. 6A, it is further contemplated that this value could be programmed, under the control of the control unit 122, and could in addition be programmed via the JTAG interface 128 which provides an external interface into the SoC. Accordingly, when configured in this way an external agent can specify the trace data source identifier which should be used to indicate the flush response, this value being passed via the JTAG interface 128 and control unit 122 into the trace data source identifier (flush) storage 124. The flush request counter 126 shown in the embodiment of FIG. 6A is incremented with each flush request signal received by the trace control unit 120. Each flush request signal is received by the control unit 122 of the trace control unit 120 and the control unit 122 causes the flush request counter 126 to increment. The control unit 122 may also be configured to receive a counter re-set signal via the JTAG interface 128 and in response to receiving that re-set signal to cause the flush request counter 126 to reset. This resetting functionality is not essential though, as the counter may simply be configured to wrap-around using a run of values which is sufficient to provide the required differentiation between flush request signals. The flush request counter 126 provides a flush request counter value which (as described below with reference to FIG. 7A) can be provided as data associated with a trace data source identifier, such that the recipient of the trace stream can distinguish between the responses to multiple flush request signals.

FIG. 6B schematically illustrates another embodiment of the trace control unit 130, which operates under the general control of its control unit 132. In particular, the trace control unit 130 comprises a flush request identifier value storage 134 which is used to hold a unique value received from an external source via the JTAG interface 136 (and via the control unit 132). This configuration enables the external agent (for example a debugger) to associate a unique value with a flush request signal, such that the flush response made may be labelled with this unique value, such that (again in the context of multiple flush request signals) a particular flush request response can be identified by the recipient of the trace stream.

Figure 7A:
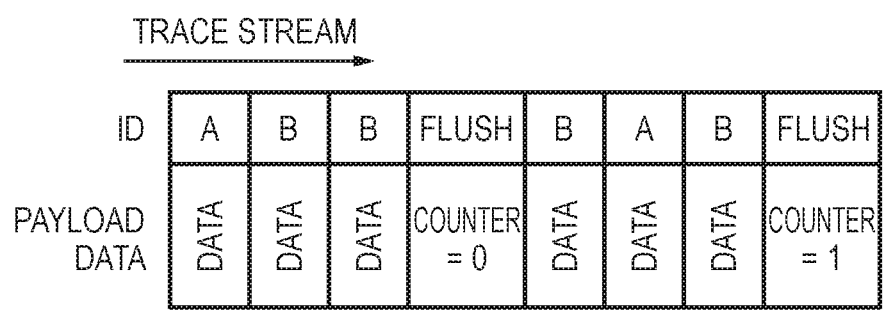
FIGS. 7A and 7B illustrates how payload data associated with a trace data source identifier used to indicate a flush response can carry information about a particular flush request signal.
Figure 7B:
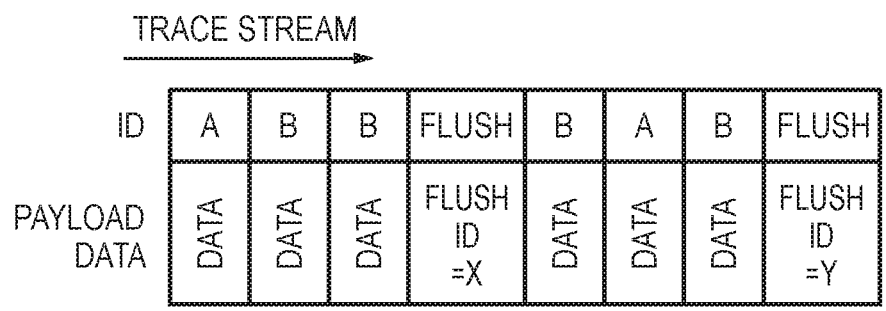

FIGS. 7A and 7B schematically illustrate the content of two example trace streams, illustrating the response of the trace data generation circuitry to the reception of multiple flush request signals. The example of FIG. 7A corresponds to a data processing apparatus such is that illustrated in FIG. 1, in particular where there are two trace data sources, here labelled A and B. The upper part of FIG. 7A shows the trace data source identifiers used in the trace stream, whilst the lower portion of FIG. 7A shows the corresponding data attributed to those trace data sources ("payload data"). Hence, it can be seen in FIG. 7A that the trace stream illustrated begins with data attributed to the trace data source A, followed by two blocks of data attributed to the trace data source B. Next, a reserved trace data source identifier ("flush") is used to indicate that the response of the apparatus to a flush request signal is complete. Note that the payload data which is associated with this flush identifier indicates a counter value of 0. Referring to FIG. 6A this counter value is provided by the current value of the counter 126 when the corresponding flush request signal is received by the trace control unit 120. Further trace data associated with the trace data sources A and B then follows in FIG. 7A, and finally a further usage of the reserved flush indicator is made, but this time the associated payload data indicates a counter value of 1, this corresponding to a subsequent flush request signal which was received by the trace control unit 120, causing the flush request counter 126 to increment.

FIG. 7B schematically illustrates a similar tracing situation, namely where trace data sources A and B are providing trace data items which form the trace stream and wherein two consecutive flush request signals are received. However, here the apparatus is configured so that the apparatus generating this trace stream is configured as schematically illustrated in FIG. 6B and accordingly the payload data associated with each of the flush identifiers corresponds to a specific flush request identifier value, the first flush request identifier value being X and the second flush request identifier value being Y. These specified flush request identifier values were received by the trace control unit 130 in association with the respective flush request signals. Accordingly, the recipient of this trace stream (which will typically also be the originator of the flush request signals) can distinguish between the responses to the multiple flush request signals either by reference to the incrementing counter (see FIG. 7A) or to the unique flush request identifier value associated with each flush request signal and flush identifier (see FIG. 7B).

Figure 8A:
FIGS. 8A-8D illustrate how payload data provided in association with a trace data source identifier can be used to indicate flush responses from one or more trace data sources.

The flush identifiers and payload data can also be used to provide the recipient of the trace stream with further information relating to the response of different trace data sources within the system to a flush request signal. FIG. 8A shows the usage of a single selected trace data source identifier "FLUSH (ALL)" to indicate that all trace data sources in the system (in the examples of FIGS. 8A-8D this being three trace data sources A, B, C) have responded to the flush request signal. For example, referring to the mechanism illustrated in FIG. 3A, the trace interface unit can be configured to introduce this "FLUSH (ALL)" identifier into the trace stream once the flush marker (FM) has been returned from each of the trace units (A-C) to which it has passed the flush request signal.

Figure 8B:

As a variant on the example of FIG. 8A, FIG. 8B shows the usage of three separate selected trace data source identifiers to indicate an individual response from each of the three trace data sources (A-C) in the system. Again, referring to the mechanism schematically illustrated in FIG. 3A, the trace interface unit can therefore be configured to introduce the corresponding flush indicator once the flush marker (FM) is received from a given trace unit. Accordingly, FIG. 8B illustrates a situation in which after the reception of a flush request signal by the data processing apparatus, trace data source A has flushed first, followed by trace data source B and finally trace data source C.

Figure 8C:
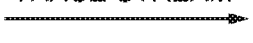
Figure 8D:
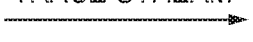

It will be noted that the examples of FIGS. 8A and 8B do not make use of payload data associated with the flush identifiers, but this is also a possibility as is schematically shown in FIGS. 8C and 8D. In the example shown in both FIGS. 8C and 8D a generic flush indicator "FLUSH" is used, and the payload data associated with that identifier is used to communicate information to the recipient of the trace stream about the respective responses of the trace data sources. Accordingly, as can be seen in FIG. 8C, an "ALL" indication in the payload data associated with the generic flush indicator is used to indicate that all three trace data sources have completed their flush responses. FIG. 8D shows a different situation in which firstly the generic flush indicator is used with associated payload data indicating trace data sources A and B, followed by a further usage of the generic flush indicator and payload data indicating trace data source C.

Figure 9:
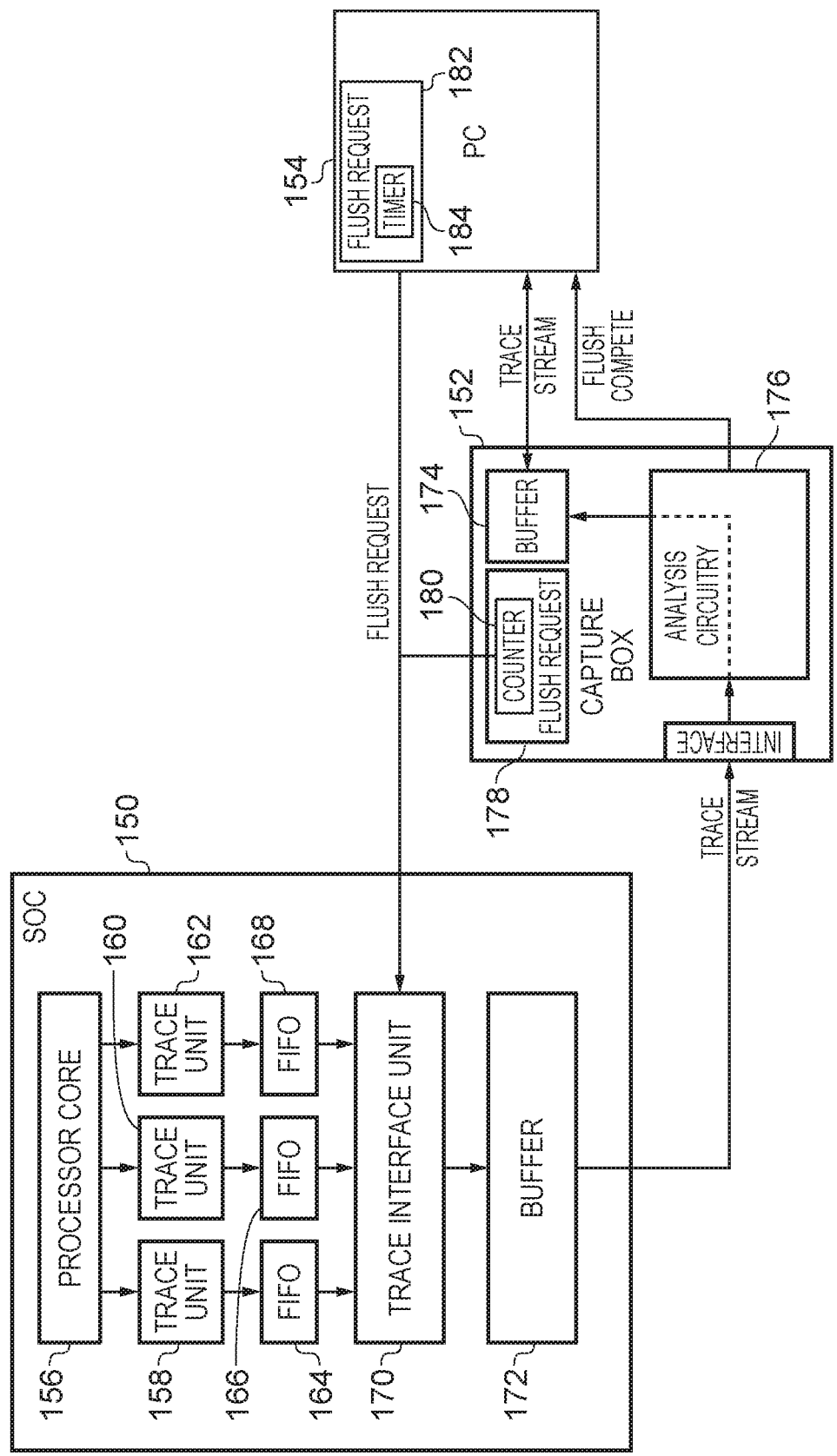
FIG. 9 schematically illustrates a system-on-chip device which is being monitored by an associated capture box and personal computer.

FIG. 9 schematically illustrates a system comprising a SoC 150, a capture box 152 and a computer (PC) 154. The SoC 150 comprises a processor core 156, the operations of which are desired to be studied. For this purpose, trace units 158, 160, 162 are provided, together with FIFOs 164, 166, 168 and trace interface unit 170. A buffer 172 is also provided on the trace stream output path of the trace interface unit. The sub-components of the SoC 150 may be configured in accordance with the embodiments of, for example, FIG. 1 or FIG. 2 and are not described in further detail here. Overall control of the monitoring of the processor core 156 is administered by the PC 154. The capture box 152 lies on the trace stream path between the SoC 150 and the PC 154 and is provided with a buffer 174 in which it can accumulate trace stream data received from the SoC 150. The capture box 152 is also provided with analysis circuitry 176, which is configured to perform some analysis of the trace stream which the capture box receives and buffers. In particular, the analysis circuitry 176 is configured to identify any selected trace data source identifiers which the trace interface unit 170 uses to indicate a response to a received flush request signal. Having identified a selected trace data source identifier in this manner, the analysis circuitry 176 is configured to thus recognise where the response of the trace generation circuitry in the SoC 150 (in particular the trace units 158, 160 and 162) to a flush request signal ends. The analysis circuitry 176 can then for example cause the content of the trace stream before and after this point to be separately identified when stored, such that the PC 154, when accessing the buffer 174, can be provided with a corresponding block of trace data for further analysis. In the situation where the analysis circuitry 176 identifies a selected trace data source identifier being used to indicate a flush response, it may also signal this "flush complete" status to the PC 154.

The flush request signal may originate from either the capture box 152 or the PC 154 of the embodiment of FIG. 9. For example, as shown in the figure, the capture box 152 is provided with flush request generation circuitry 178 which as illustrated comprises a counter 180. Accordingly, the capture box 152 can be configured to generate flush requests which are transmitted to the trace interface unit 170 in the SoC 150, each associated with a counter value generated by the counter unit 180. In this situation the SoC 150 will be provided with a trace control unit 120 such as is schematically illustrated in FIG. 6A, so that a corresponding counter 126 within the trace control unit 120 can increment with each flush request received, and therefore the count values used between the capture box 152 and the trace control unit 120 can be correlated. Alternatively, the flush request may for example originate from the PC 154. This flush request may be generated on an ad-hoc basis as required according to the analysis being performed by the PC 154, but may also for example be periodically generated on the basis of a timer, and for this purpose the PC 154 can be considered to comprise flush request generation circuitry 182 and a timer 184 for the purpose of generating these periodic flush requests.

Figure 10:
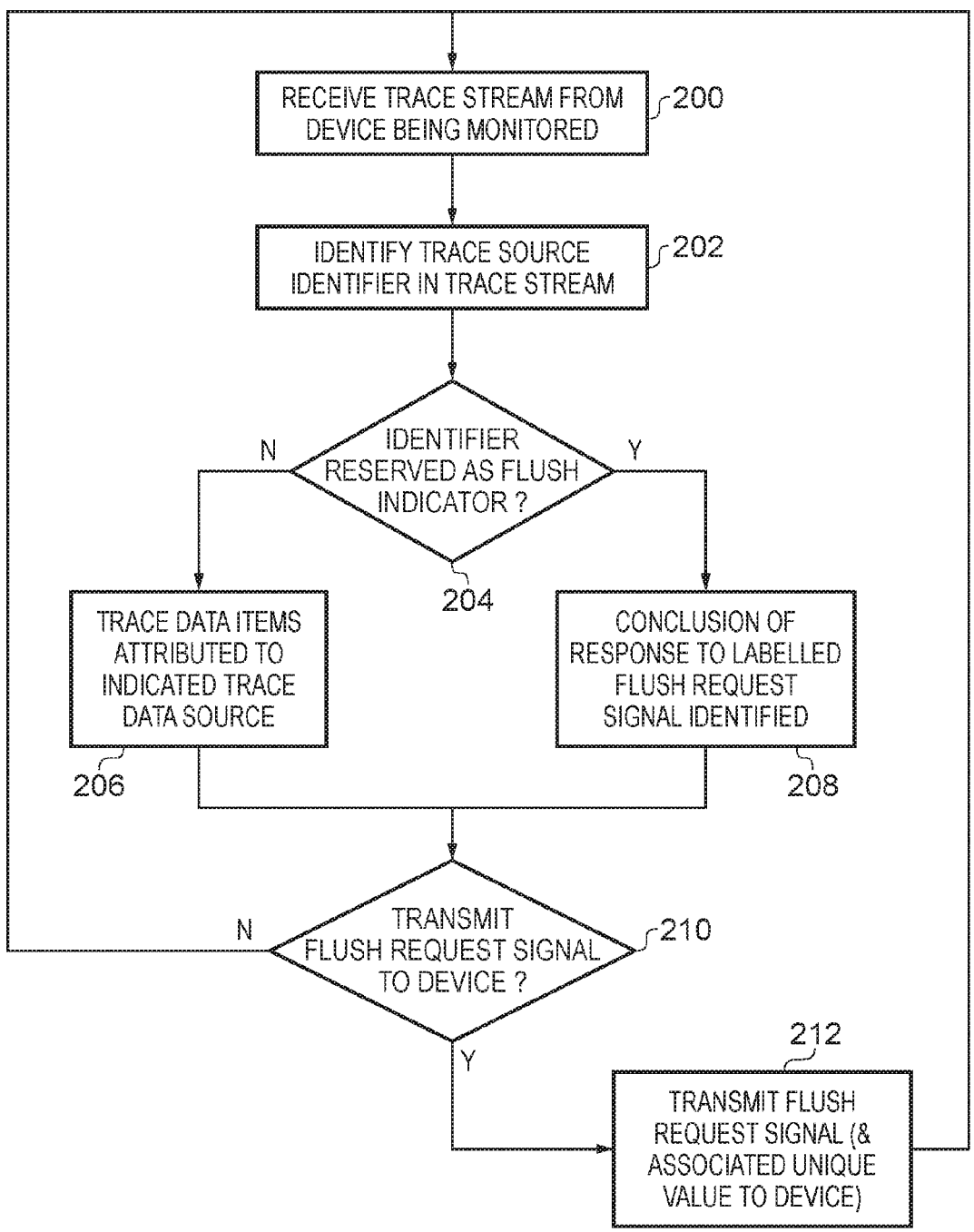
FIG. 10 illustrates a sequence of steps which are taken by the method of one embodiment.

FIG. 10 schematically illustrates a series of steps which are taken in the method of one embodiment, in which a trace stream is received from a device being monitored and is analysed. As such this method could for example be carried out by the capture box 152 or PC 154 in the example of FIG. 9, or could be carried out by software executing on the processor core 12 in the example of FIG. 2. The flow can be considered to begin at step 200 where the trace stream is received on an ongoing basis from the device being monitored. A trace source identifier is identified in the trace stream at step 202 and at step 204 it is determined if the trace source identifier is one that has been reserved in the system to indicate a response to a flush request. If it is not such a reserved indicator then the flow proceeds to step 206, where the corresponding data associated with that identifier is allocated to the identified trace data source. In other words, the corresponding data is interpreted as having been generated by the trace data source indicated by that identifier. If however at step 204 a reserved identifier is found then the flow proceeds to step 208, where the reserved identifier is interpreted as the conclusion of a response to a received flush response signal. The particular use of this reserved identifier may take a number of forms, such as for example are shown in FIGS. 7A & 7B and in FIG. 8A-8D. Step 208 indicates that a labelled flush request signal is identified, since (see step 112 below) more than one flush request signal may have been issued and the particular flush request signal for which this reserved identifier is being used to indicate the response can therefore be identified (such as by the counter or unique value mechanisms discussed with reference to FIGS. 6A & 6B and 7A & 7B). Thereafter, step 210 represents the decision of whether to transmit a flush request signal to the device. When such a flush request signal is not transmitted then the flow returns to step 200 and the loop of steps continues. However, when at step 210 it is decided to transmit a flush request signal to the device, then this flush request signal is sent at step 212 along with a label (associated unique value) which will be used by the device and enables the subsequent flush response to be attributed to this particular flush request signal. The flow then returns to step 200 and the loop of steps continues.

Figure 11:
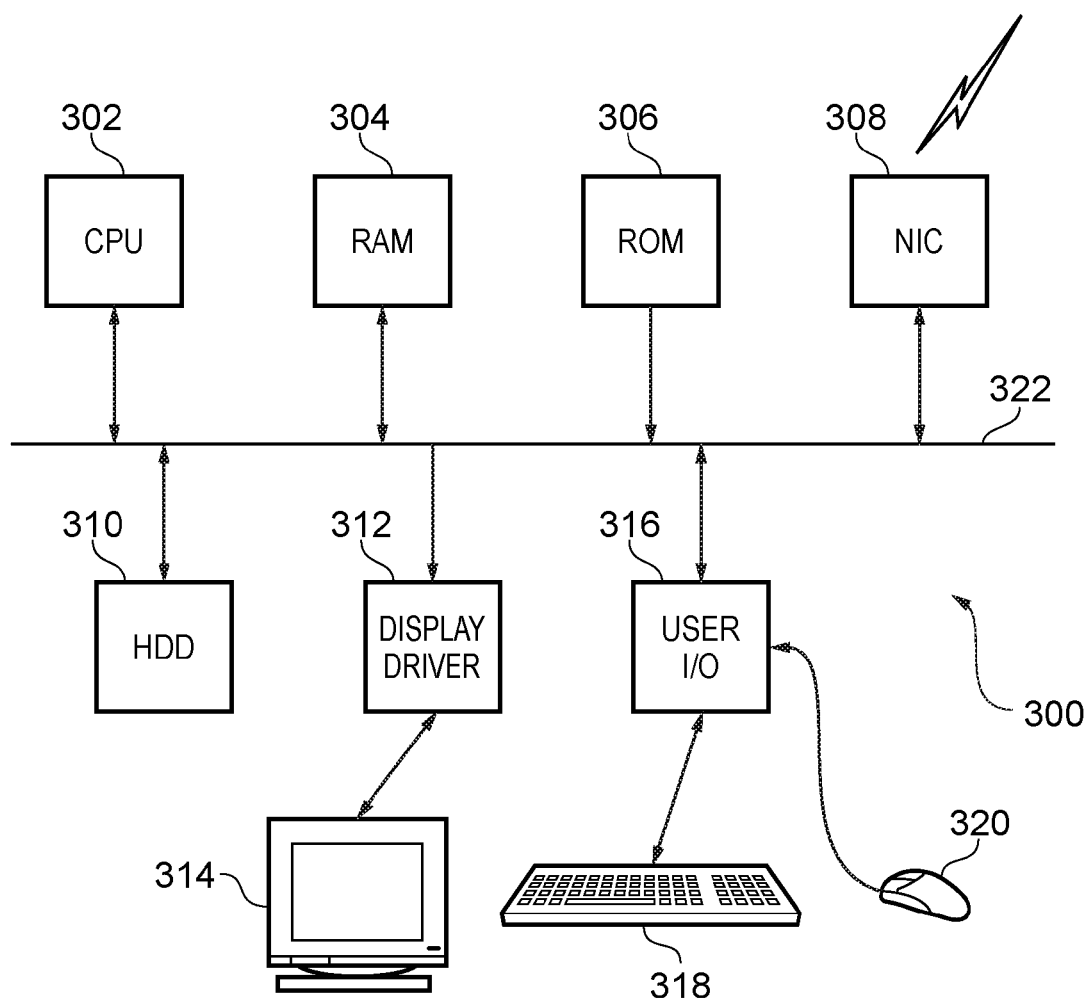
FIG. 11 schematically illustrates a general purpose computing device on which some embodiments of the present techniques may be carried out.

FIG. 11 schematically illustrates a general purpose computing device 300 of the type that may provide the PC 154 shown in FIG. 9. The general purpose computing device 300 includes a central processing unit 302, a random access memory 304 and a read only memory 306, connected together via bus 322. It also further comprises a network interface card 308, a hard disk drive 310, a display driver 312 and monitor 314 and a user input/output circuit 316 with a keyboard 318 and mouse 320 all connected via the common bus 322. In operation, such as when executing data processing instructions which include an instruction configured to cause the device to carry out the present techniques, the central processing unit 302 will execute computer program instructions that may for example be stored in the random access memory 304 and/or the read only memory 306. Program instructions could be additionally retrieved from the hard disk drive 310 or dynamically downloaded via the network interface card 308. The results of the processing performed may be displayed to a user via a connected display driver 312 and monitor 314. User inputs for controlling the operation of the general purpose computing device 300 may be received via a connected user input output circuit 316 from the keyboard 318 or the mouse 320. It will be appreciated that the computer program could be written in a variety of different computer languages. The computer program may be stored locally on a recording medium or dynamically downloaded to the general purpose computing device 300. When operating under control of an appropriate computer program, the general purpose computing device 300 can perform the role of the PC 154 and can be considered to form an apparatus for performing the above described trace data analysis techniques. The architecture of the general purpose computing device 300 could vary considerably and FIG. 11 is only one example.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. Apparatus for processing data, the apparatus comprising:
   one or more trace data sources configured to generate items of trace data indicative of the data processing operations performed by associated data processing circuitry; and
   trace stream generation circuitry configured to generate a trace stream to be output from the apparatus from the items of trace data, wherein the trace stream generation circuitry is configured to include one or more trace data source identifiers in the trace stream,
   wherein the apparatus is configured to receive a flush request signal and in response to the flush request signal to include a selected trace data source identifier in the trace stream,
   wherein the apparatus is configured to include all items of trace data generated before the apparatus received the flush request signal in the trace stream before the selected trace data source identifier is included in the trace stream.

2. The apparatus as claimed in claim 1, the apparatus further comprising the associated data processing circuitry configured to perform the data processing operations.

3. The apparatus as claimed in claim 1, wherein the trace stream generation circuitry is configured to include a respective trace data source identifier in the trace stream which indicates a respective trace data source of the one or more trace data sources which generated a respective portion of the trace stream.

4. The apparatus as claimed in claim 1, comprising more than one trace data source and wherein the trace stream generation circuitry is configured to include in the trace stream a corresponding trace data source identifier after all items of trace data generated by a corresponding trace data source before the apparatus received the flush request signal.

5. The apparatus as claimed in claim 1, further comprising at least one trace buffer downstream of the trace stream generation circuitry and configured to buffer the trace stream before it is output from the apparatus, in particular wherein the trace stream generation circuitry is configured to generate a flush propagation signal in response to the flush request signal, the flush propagation signal configured to cause any trace data buffered in the at least one trace buffer to be output from the apparatus.

6. The apparatus as claimed in claim 1, wherein the apparatus is configured to generate payload data to be included in the trace stream associated with the selected trace data source identifier, in particular wherein the payload data is indicative of a respective flush request signal of multiple flush request signals received by the apparatus.

7. The apparatus as claimed in claim 6, wherein the apparatus comprises a counter unit configured to increment a counter value for each flush request signal received, and wherein the apparatus is configured to include the counter value in the payload data.

8. The apparatus as claimed in claim 6, wherein the apparatus comprises flush response identifier value storage configured to store a flush response identifier value and to include the flush response identifier value in the payload data.

9. The apparatus as claimed in claim 8, wherein the flush response identifier value storage is configured to be programmed by at least one of: an external interface to the apparatus; and control circuitry in the apparatus.

10. The apparatus as claimed in claim 9, wherein the apparatus is configured to receive the flush request signal via the external interface and to receive the flush response identifier value in association with the flush request signal.

11. The apparatus as claimed in claim 6, wherein the apparatus is configured to include in the payload data an indication of one or more trace data sources for which all respective items of trace data generated before the apparatus received the flush request signal have been included in the trace stream.

12. The apparatus as claimed in claim 1, wherein the apparatus is configured such that the selected trace data source identifier which is included in the stream of trace data is programmable, in particular by at least one of: an agent external to the apparatus and by control circuitry within the apparatus.

13. The apparatus as claimed in claim 1, further comprising:
trace analysis circuitry configured to receive the trace stream and to identify the selected trace data source identifier in the trace stream of trace data as a conclusion of a response to a flush request signal received by the further data processing apparatus.

14. A method of processing data in a data processing apparatus, the method comprising the steps of:
generating in one or more trace data sources items of trace data indicative of the data processing operations performed by associated data processing circuitry;
generating a trace stream to be output from the data processing apparatus;
including one or more trace data source identifiers in the trace stream;
receiving a flush request signal;
in response to the flush request signal, including a selected trace data source identifier in the trace stream,
wherein the step of generating the trace stream is configured to include all items of trace data generated before the flush request signal was received in the trace stream before the selected trace data source identifier is included in the trace stream.

15. Apparatus for processing data, the apparatus comprising:
trace stream reception circuitry configured to receive a trace stream, wherein the trace stream is indicative of the data processing operations performed by data processing circuitry in a further data processing apparatus, wherein the trace stream includes one or more trace data source identifiers indicative of one or more trace data sources in the further data processing apparatus;
trace analysis circuitry configured to identify a selected trace data source identifier in the trace stream as a conclusion of a response to a flush request signal received by the further data processing apparatus.

16. The apparatus as claimed in claim 15, further comprising flush request circuitry configured to generate the flush request signal for transmission to the further data processing apparatus.

17. The apparatus as claimed in claim 16, wherein the apparatus comprises a counter unit configured to increment a counter value for each flush request signal transmitted to the further data processing apparatus,
and wherein the trace analysis circuitry is configured to identify the counter value in payload data in the trace stream associated with the selected trace data source identifier.

18. The apparatus as claimed in 16, wherein the apparatus is configured to cause a flush response identifier value to be stored in flush response identifier value storage in the further data processing apparatus, wherein the flush response identifier value is indicative of a selected flush request signal which is transmitted to the further data processing apparatus.

19. The apparatus as claimed in claim 15, wherein the apparatus is configured to pass the trace stream on to an analysis apparatus and is configured to signal identification of the selected trace source identifier to the analysis apparatus.

20. A method of processing data, the method comprising the steps of:
receiving a trace stream, the trace stream indicative of data processing operations performed by data processing circuitry in a data processing apparatus, wherein the trace stream includes one or more trace data source identifiers indicative of one or more trace data sources in the data processing apparatus;
identifying a selected trace data source identifier of the trace data source identifiers included in the trace stream; and
delimiting the selected trace data source identifier in the trace stream as a conclusion of a response to a flush request signal received by the data processing apparatus.

21. A non-transitory, computer readable storage medium having stored thereon a computer program configured, when executed on a computer, to cause the computer to carry out the method of claim 20.

* * * * *